(12) United States Patent
Seaton et al.

(10) Patent No.: US 11,257,250 B2
(45) Date of Patent: Feb. 22, 2022

(54) BLENDED PHYSICAL AND VIRTUAL REALITIES

(71) Applicant: Outward, Inc., San Jose, CA (US)

(72) Inventors: Brook Seaton, Oakland, CA (US); Manu Parmar, Sunnyvale, CA (US); Clarence Chui, Los Altos Hills, CA (US)

(73) Assignee: Outward, Inc., San Jose, CA (US)

(*) Notice: Subject to any disclaimer, the term of this patent is extended or adjusted under 35 U.S.C. 154(b) by 71 days.

(21) Appl. No.: 16/176,207

(22) Filed: Oct. 31, 2018

(65) Prior Publication Data

US 2019/0130604 A1 May 2, 2019

Related U.S. Application Data

(60) Provisional application No. 62/579,786, filed on Oct. 31, 2017.

(51) Int. Cl.
| | | |
|---|---|---|
| *G06T 7/73* | (2017.01) | |
| *G06K 9/00* | (2006.01) | |
| *G06T 19/00* | (2011.01) | |
| *G06T 17/20* | (2006.01) | |
| *G06K 9/32* | (2006.01) | |

(52) U.S. Cl.
CPC ............ *G06T 7/75* (2017.01); *G06K 9/00201* (2013.01); *G06K 9/00671* (2013.01); *G06K 9/3208* (2013.01); *G06T 17/20* (2013.01); *G06T 19/00* (2013.01); *G06T 19/006* (2013.01); *G06T 2207/30244* (2013.01)

(58) Field of Classification Search
CPC ....... G06T 7/75; G06T 17/20; G06T 19/0006; G06K 9/00201; G06K 9/00671; G06K 9/3268
See application file for complete search history.

(56) References Cited

U.S. PATENT DOCUMENTS

| | | | | |
|---|---|---|---|---|
| 6,633,304 | B2* | 10/2003 | Anabuki | G02B 27/017 |
| | | | | 345/633 |
| 2013/0290876 | A1 | 10/2013 | Anderson | |
| 2013/0342564 | A1* | 12/2013 | Kinnebrew | G09G 3/003 |
| | | | | 345/619 |
| 2016/0086336 | A1 | 3/2016 | Kuen-Han | |

(Continued)

FOREIGN PATENT DOCUMENTS

| | | | | |
|---|---|---|---|---|
| EP | 2930671 A1 * | 10/2015 | ............ | G06T 19/00 |
| WO | 2015090421 | 6/2015 | | |
| WO | 2016122991 | 8/2016 | | |

*Primary Examiner* — Zhitong Chen
(74) *Attorney, Agent, or Firm* — Van Pelt, Yi & James LLP

(57) ABSTRACT

Techniques for providing blended physical and virtual reality experiences are disclosed. In some embodiments, a pose of a camera of a device located in a venue is determined based at least in part on three-dimensional asset recognition in a field of view of the camera, wherein the field of view of the camera comprises an actual physical view of the venue; a virtual view corresponding to the actual view is obtained from existing assets comprising a specification of a virtualized version of the venue; and display of the virtual view is facilitated at the venue. Thus, a virtual reality of a physical space is provided while at the physical space based on actual three-dimensional objects detected or recognized in the physical space.

54 Claims, 2 Drawing Sheets

(56) References Cited

U.S. PATENT DOCUMENTS

2016/0148433 A1\* 5/2016 Petrovskaya ......... G06T 19/006
   345/633
2016/0189384 A1   6/2016 Meier
2019/0099678 A1\* 4/2019 Khan .................... A63F 13/213

\* cited by examiner

BLENDED PHYSICAL AND VIRTUAL REALITIES

CROSS REFERENCE TO OTHER APPLICATIONS

This application claims priority to U.S. Provisional Patent Application No. 62/579,786 entitled BLENDED PHYSICAL AND ONLINE RETAIL EXPERIENCE filed Oct. 31, 2017, which is incorporated herein by reference for all purposes.

BACKGROUND OF THE INVENTION

Existing mixed physical and virtual reality systems and applications are typically limited due to the corresponding physical space or environment not being well defined. Thus, improved blended reality systems and applications that overcome existing limitations are needed and disclosed herein.

BRIEF DESCRIPTION OF THE DRAWINGS

Various embodiments of the invention are disclosed in the following detailed description and the accompanying drawings.

DETAILED DESCRIPTION

Figure 1:
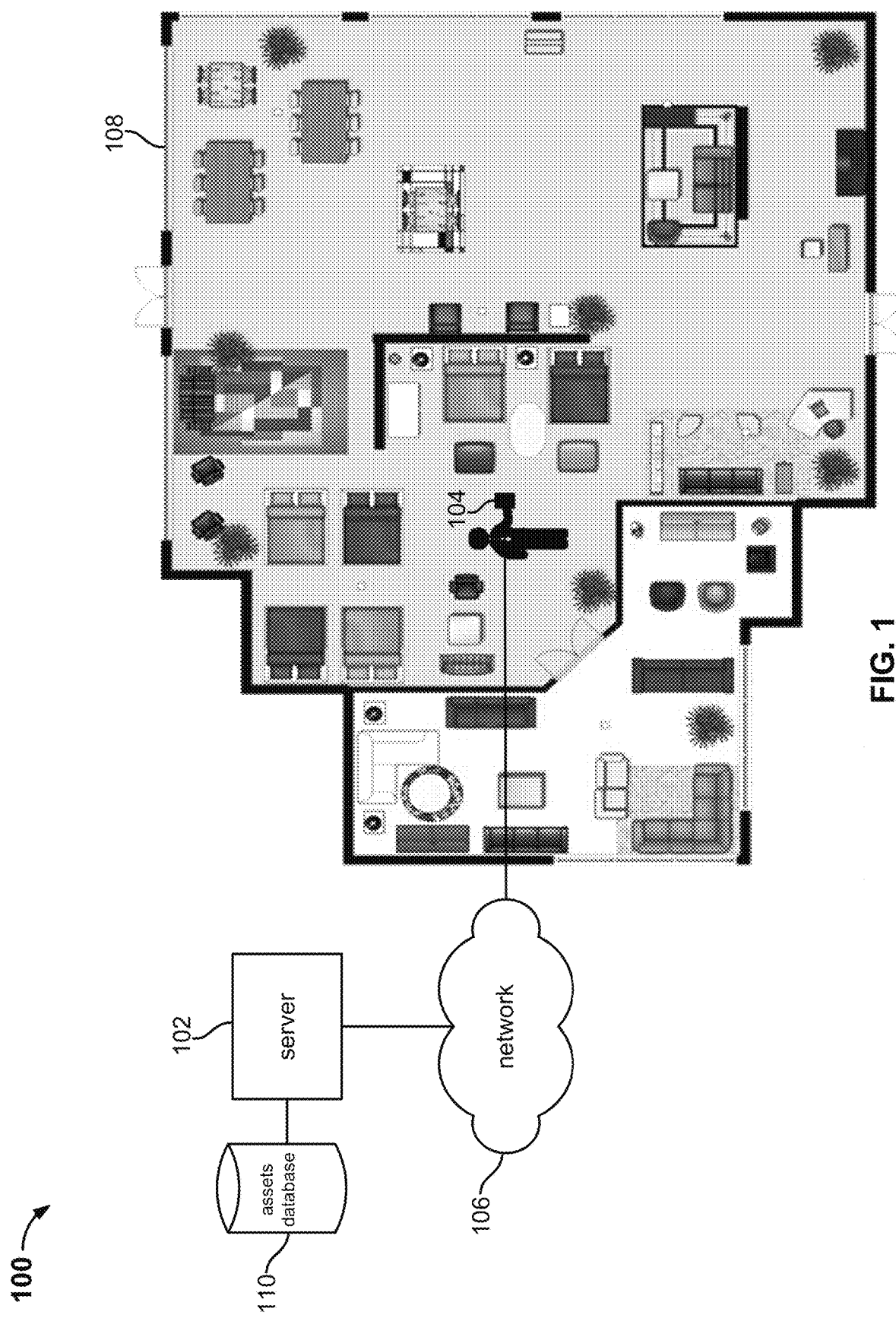
FIG. 1 is a high level block diagram illustrating an embodiment of a network environment in which a service or application for blending physical and virtual realities is provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for blending physical and virtual realities are disclosed herein. In some embodiments, in order to provide a different or more enhanced viewing experience than actual reality, a user is presented with a view that is at least in part, if not completely, virtualized. For example, a user currently present in a physical scene is provided with a virtualized version or rendering of the scene instead of an actual view of the scene seen by a camera of an associated user device, e.g., with respect to a viewfinder or display associated with the camera. In some such cases, the virtualized view or rendering is substantially identical to the actual view in terms of geometry and illumination. Substantially perfect or exact correspondence between the actual and virtualized views results from having comprehensive foreknowledge of the associated physical environment and maintaining a fully simulated replica or virtualized version of the physical environment from which photorealistic renderings of any desired arbitrary perspectives of the physical environment may be retrieved and/or generated. Substituting an actual view with a corresponding virtual view facilitates various interactive applications such as the real time ability to customize or modify objects comprising a view, change selectable options associated with objects comprising a view, configure selected options via virtual overlays on objects comprising a view, etc. In some embodiments, a virtualized or rendered view of a scene is provided via a user device display or other dedicated display while the user is physically immersed in the actual physical scene and has the opportunity of experiencing the tangible and tactile effects of presence in the actual scene, thus resulting in a blended or mixed reality user experience. Moreover, the disclosed techniques facilitate various other applications such as treating recognized objects in a current field of view of a user device camera similarly to barcodes to automatically provide or surface additional information and/or selectable options associated with detected objects and, thus, eliminate the need for barcodes to encode such information.

FIG. 1 is a high level block diagram illustrating an embodiment of a network environment 100 in which a service or application for blending physical and virtual realities is provided. In this embodiment, the service comprises client-side and server-side components. That is, the service comprises a mobile application that communicates with a server application. In other embodiments, the service may comprise a web application, with the client and server communicating via a web interface, or, generally, the service may comprise any other appropriate architecture. The blended physical and virtual reality service hosted by server 102 is provided to a plurality of user devices such as device 104 in the example of FIG. 1. A client-side application is installed on each device 104 that communicates with server 102. Device 104 in the example of FIG. 1 is depicted as a cellular or mobile phone. However, generally, device 104 may comprise any other computing device that is capable of communicating with server 102, such as a tablet computer, laptop computer, virtual or augmented reality device or headset, etc. Communication between server 102 and device 104 is facilitated via network 106, which may comprise any combination of one or more public, private, wired, and/or wireless networks, such as a cellular/mobile network or the Internet.

As depicted in FIG. 1, the user of device 104 is located within a prescribed venue 108. In the given example, venue 108 comprises the building of a home furnishings retail store in which the user is shopping. Generally, venue 108 may comprise any indoor or outdoor physical space or environment. The venue 108 and/or the part of venue 108 at which device 104 is located is known to server 102, for example, based at least in part on one or more signals available with respect to device 104 that may be employed for presence detection of device 104 at venue 108 and/or at a specific section of or location within venue 108 (e.g., a prescribed floor, department, aisle, etc., of a retail store or in proximity to a prescribed access point or beacon). Moreover, foreknowledge of architectural elements as well as other objects comprising venue 108 exists at server 102. Specifically, a virtualized version of venue 108 and/or parts thereof are stored server-side in assets database 110. In some embodiments, for instance, prior to the blended physical and virtual reality service being available for a given venue, assets database 110 is pre-populated with a specification of the venue that comprises assets (e.g., three-dimensional mesh models and/or images/photographs/renderings) from which photorealistic renderings of any desired arbitrary perspectives of the venue may be retrieved and/or generated.

A server-side specification of a virtualized version of venue 108 is based on foreknowledge of the layout or floorplan of the venue, such as, for example, known information about the architectural structure of the venue such as surfaces (walls, ceiling, floor, windows, doors), edges, corners, etc.; known types and locations of lighting fixtures at the venue; known types and locations of prescribed surface textures at the venue; known specifications of potential objects and object combinations (e.g., products and/or product displays and placements) at the venue; etc. In some embodiments, assets database 110 stores definitions of one or more three-dimensional mesh models of the venue or parts thereof (e.g., objects comprising the venue) from which a photorealistic rendering comprising any prescribed perspective of the venue and object combinations and permutations may be generated. In some embodiments, assets database 110 stores a plurality of images or views of the venue or parts thereof that span diverse perspectives from which a photorealistic rendering comprising any desired arbitrary perspective of the venue and object combinations and permutations may be retrieved or generated.

Presence of device 104 at venue 108 and/or a specific part thereof may be determined from one or more signals available with respect to device 104 that can be employed to determine or infer location of device 104. A description of some examples of signals that may be employed to determine, estimate, or track a current location or position of device 104 follows. GPS (Global Positioning System) signals may be used to identify locations in outdoor areas or environments. Cellular network signals may be used to triangulate locations in both outdoor and indoor contexts. WiFi (wireless local area network) signals and similarly Bluetooth or BLE (Bluetooth Low Energy) signals may be used to triangulate indoor locations. For instance, signal strength measurements with respect to different wireless access points or beacons within an indoors venue may be used to determine specific locations within the venue. In some cases, a dedicated presence detection architecture (e.g., transmitter network) based on any appropriate (electromagnetic) signal type may be deployed within a venue and used to determine location or position. Furthermore, sensor (e.g., compass, magnetometer, accelerometer, gyroscope, etc.) signals available at device 104 may be used to determine location. Generally, any combination of one or more signals may be employed for coarse and/or fine location determination of device 104.

In some embodiments, a location of device 104 in venue 108 and/or a position or pose (e.g., height, angle, rotation, tilt, etc.) of device 104 at a prescribed location in venue 108 may at least in part be determined via computer vision based recognition techniques for identifying known assets. In such cases, a camera of device 104 is employed, and the precise location and pose of the camera of device 104 is determined or estimated. More specifically, recognizable objects in a current field of view of the camera of device 104 are identified, e.g., via two-dimensional and/or three-dimensional tracking of depth, features, hue, saturation, etc., based on known assets 110. In some cases, specific object locations or positions within venue 108 are known, such as for objects comprising permanent or semi-permanent fixtures or landmarks (e.g., architectural elements, lighting fixtures, decorative artwork such as framed paintings or sculptures, etc.) or intentionally introduced fiducial markers. In such cases, the location or pose of device 104 may be determined based at least in part on known locations or positions of detected elements or objects that are present in a current camera field of view. Alternatively, some objects may be movable within venue 108. In such cases, object locations or positions may not be known and may have to be determined based on one or more other objects in the camera's current field of view whose locations or positions are known and/or other location or position detection techniques. During object recognition, constraints on placements of movable objects in the venue may be employed to narrow the search of the assets database to a smaller subset of the entire database. As an example, a particular department of a retail store may be constrained to include only a prescribed subset of all available products sold in the retail store. Thus, the database search during object recognition may at least in part be constrained to a small subset of the entire assets database based on at least some known location information of the device.

Based on determined real time location and pose of device 104 (and hence of the camera of device 104) and detected objects in the current field of view of the camera, a rendering comprising a virtualized version of the current field of view of the camera of device 104 is generated at server 102 from assets available in database 110 and provided to device 104 for display instead of and/or in addition to the actual real time view seen or framed by the camera of device 104. In some embodiments, a view displayed at device 104 is completely virtualized, i.e., comprises a rendering of the current camera field of view that does not include any of the actual view seen by the camera of device 104. Alternatively, in some embodiments, a view displayed at device 104 comprises a blended, augmented, or mixed reality view that includes at least some of the actual view seen by the camera. In some such cases, for instance, a rendering received from server 102 may be overlaid or superimposed on an actual view seen by the camera of device 104 to generate a composite view. A view may be rendered to have precise or consistent lighting that corresponds to the lighting of the actual view since information about the locations and types of lighting fixtures at the venue are known. That is, known locations and types of lighting may be related with device/camera pose to generate a rendering having correct lighting that corresponds to or matches the actual lighting at that perspective in the venue. Alternatively, a view may be rendered to have different lighting. For example, a user may desire to replace actual lighting in a store with user specified or selected lighting so that the user can simulate how a particular product or product display appears in such lighting.

The disclosed techniques for providing an at least partially, if not completely, virtualized or rendered view rather than simply providing a counterpart actual view offer many novel features and applications. For example, because of comprehensive foreknowledge of a venue and possible scene compositions within the venue as well as the ability to exactly identify location and pose, the disclosed techniques facilitate determination of the precise real time view or perspective of the venue being seen or framed by a camera, i.e., in the field of view of the camera, as a user of the corresponding device moves through the venue and points or aims the device/camera to capture different perspectives within the venue. Determination of scene composition and perspective (i.e., camera location and pose) facilitates substituting or replacing an actual view as seen by a camera with a virtual or rendered view, which may be substantially identical to the actual view or may comprise an alternative or enhanced version of the actual view. In some embodiments, a virtual or rendered view may be communicated to and displayed on a dedicated augmented reality screen or display in addition to and/or instead of a display associated with the user device. Providing a virtualized or rendered view facilitates dynamic modifications to configurable or selectable options associated with a scene or parts thereof. For example, a user viewing a scene comprising a sofa may select to change the fabric and color of the sofa and be presented with a rendered view corresponding to the selections in real time. Furthermore, content may be added to or removed from a virtualized or rendered view, e.g., automatically or based on user specifications. For example, a user may specify the addition or removal of certain objects while planning a room in front of a room display at a furniture store; one or more extraneous objects (e.g., trash laying on the floor, other customers in the frame, etc.) present in an actual view may be automatically removed in a virtual or rendered view; items or objects may be intentionally added into a virtual view, e.g., to satisfy product placement contracts with advertisers, etc.

Precisely identifying and locating three-dimensional elements or objects in a physical scene in real time, e.g., as the scene is viewed from a camera, based at least in part on known assets associated with the scene and computer vision based recognition as described herein is substantially a different problem and has a different solution than, for example, identifying two-dimensional elements in images, which can readily be identified using standard two-dimensional image processing techniques. Moreover existing location detection techniques typically identify proximity and not the precise or exact location/pose or perspective of a device (i.e., of the camera of the device with respect to a viewed scene) as described herein. Furthermore, detailed tagging of an asset in database 110 facilitates surfacing of additional information or options with respect to an identified or recognized object, such as, for instance, an associated web page (e.g., a product page) or hyperlink thereof, video, three-dimensional animation, augmented reality animation, instant bidding, ordering, purchasing, etc. For example, in some embodiments, a user may access such additional information or options associated with an object by simply pointing or aiming a user device/camera at the object in a physical space. Thus, the described techniques support physically based navigation of information and options, eliminating the need for physical tags or barcodes to access such information, which do not seamlessly integrate with the aesthetics of the physical scene.

Figure 2:
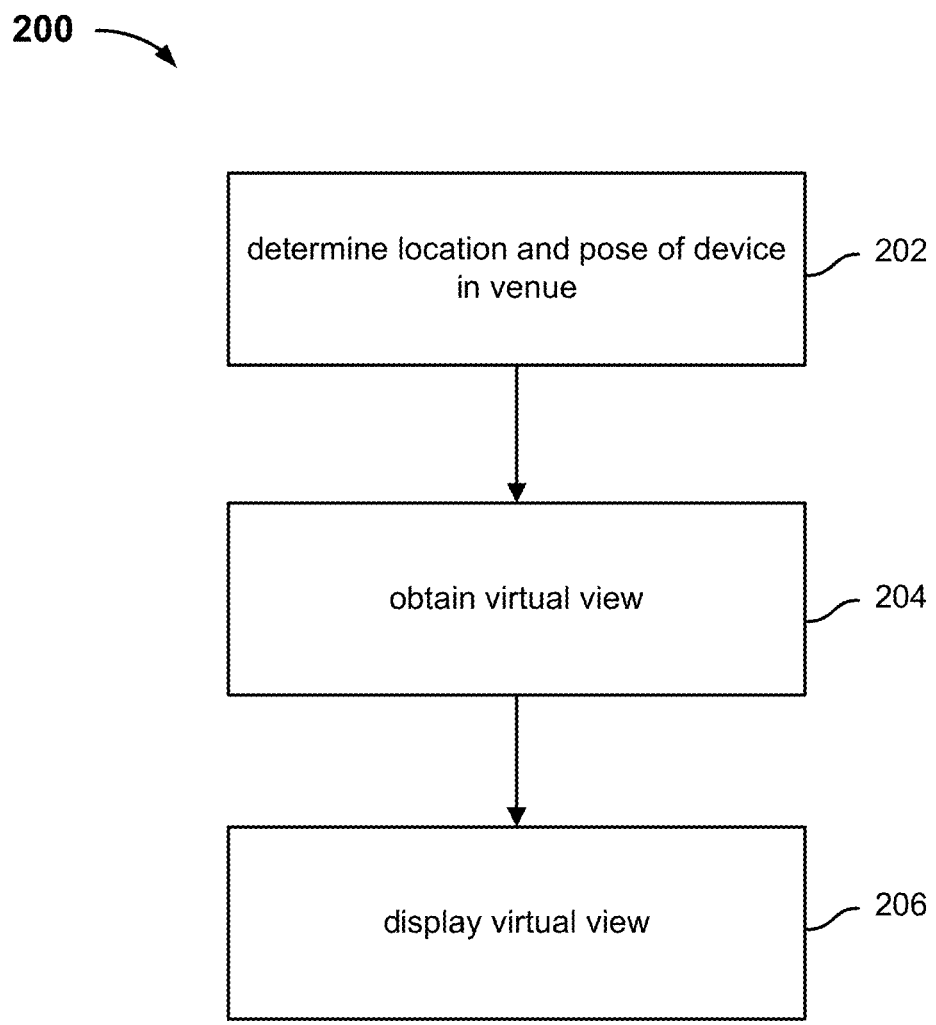
FIG. 2 is a high level flow chart illustrating an embodiment of a process for facilitating display of a virtual view.

FIG. 2 is a high level flow chart illustrating an embodiment of a process for facilitating display of a virtual view. For example, one or more steps or sub-steps of process 200 may be performed by the client and/or the server of the client-server application architecture described with respect to network environment 100 of FIG. 1. In some embodiments, process 200 comprises a dynamic, real time process.

At step 202, the location and pose of a user device within a venue is determined. That is, in some cases, step 202 comprises determining a pose (e.g., relative position and orientation) of a camera of the device within the venue. Coarse and/or fine location of the device at the venue or a prescribed part of the venue may be determined from one or more signals available at the device such as GPS signals, cellular signals, WiFi signals, Bluetooth or BLE signals, other electromagnetic signals, sensor signals, etc. A finer, more precise location of the device and/or the pose of the device at a prescribed location may be determined based at least in part on three-dimensional asset recognition in a field of view of the camera using any appropriate computer vision techniques for identifying or recognizing known assets. With respect to the client-server application architecture of FIG. 1, for example, location may at least in part be determined client-side and communicated to the server, and/or information used for determining location (e.g., signals from which location can be determined or inferred) as well as pose (e.g., current actual view in the field of view of the camera) may be communicated to the server for (finer, more precise) determination of location and/or for determining pose server-side.

At step 204, a virtual view that corresponds to an actual view of the venue in a current field of view of the camera is obtained, for example, from existing assets comprising a specification of a virtualized version of the venue. The existing assets may comprise one or more three-dimensional polygon mesh models and/or images spanning a plurality of perspectives of the venue and/or parts thereof. In various embodiments, the virtual and actual views may comprise (substantially) the same camera pose, the same perspective of the venue, the same scene of the venue, the same scene geometry, the same scene lighting, etc. In some embodiments, the virtual view comprises an alternative or augmented version of the actual view. For example, the virtual view may comprise one or more scene elements having different configurations or selectable options than the same scene elements in the actual view. In some embodiments, the virtual view comprises a photorealistic quality or resolution. Alternatively, in some embodiments, the virtual view may not be photorealistic and perhaps instead may be a cartoon or animation version of the actual view. With respect to the client-server application architecture of FIG. 1, for example, the server obtains the virtual view by retrieving or generating (i.e., rendering) the virtual view from existing assets, and the client obtains or receives the virtual view from the server.

As step 206, the virtual view is displayed. The virtual view may be displayed in real time as the corresponding actual view is captured in the field of view of the camera of the device. In some cases, displaying the virtual view comprises replacing or substituting the actual view with the virtual view. In some cases, displaying the virtual view comprises overlaying the virtual view on top of the actual view. In some embodiments, the displayed virtual view facilitates surfacing of additional information or available options with respect to objects comprising the view. In various embodiments, the virtual view may be displayed on a display of the device or communicated to a dedicated display or screen at the venue that displays virtual reality (VR) or augmented reality (AR) views. With respect to the client-server application architecture of FIG. 1, for example, the server facilitates display of the virtual view by providing the virtual view to the client for display, and the client facilitates display of the virtual view on a display of the client device or another external display.

The disclosed techniques facilitate providing blended physical and virtual reality experiences. As described, a virtual reality of a physical space is provided while at the physical space based on actual three-dimensional objects detected or recognized in the physical space.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining a pose of a camera of a device located in a venue based at least in part on three-dimensional asset recognition in a field of view of the camera, wherein the field of view of the camera comprises an actual view of the venue and wherein three-dimensional asset recognition is constrained to a prescribed set of objects with placement constraints on movable objects;
    obtaining a rendering of the venue corresponding to the actual view of the venue from one or more existing assets comprising a specification of a virtualized version of the venue, wherein foreknowledge of the venue and existing assets comprising the specification of the virtualized version of the venue exist prior to the device being located in the venue; and
    facilitating display of the rendering of the venue by replacing the actual view of the venue as captured by the camera with the rendering of the venue, wherein the rendering of the venue is completely virtualized and does not include any of the actual view of the venue and wherein the rendering of the venue comprises one or more interactive features including user configurable options for one or more objects comprising the rendering.

2. The method of claim 1, wherein the rendering of the venue and the actual view of the venue have substantially the same camera pose.

3. The method of claim 1, wherein the rendering of the venue and the actual view of the venue both comprise substantially a same perspective of the venue.

4. The method of claim 1, wherein the rendering of the venue and the actual view of the venue both comprise substantially a same scene of the venue.

5. The method of claim 1, wherein the rendering of the venue and the actual view of the venue both comprise substantially same scene geometry.

6. The method of claim 1, wherein the rendering of the venue and the actual view of the venue both comprise substantially same scene lighting.

7. The method of claim 1, wherein the rendering of the venue comprises an alternative or augmented version of a scene comprising the actual view of the venue.

8. The method of claim 1, wherein the rendering of the venue comprises at least one scene element having a different configuration than that same scene element in the actual view of the venue.

9. The method of claim 1, wherein obtaining the rendering of the venue comprises retrieving the rendering of the venue from existing assets.

10. The method of claim 1, wherein obtaining the rendering of the venue comprises generating the rendering of the venue from existing assets.

11. The method of claim 1, wherein existing assets comprise one or more three-dimensional mesh models.

12. The method of claim 1, wherein existing assets comprise one or more images spanning a plurality of perspectives.

13. The method of claim 1, wherein the rendering of the venue is displayed in real time as the actual view of the venue is captured in the field of view of the camera.

14. The method of claim 1, wherein the rendering of the venue comprises a photorealistic rendering.

15. The method of claim 1, wherein existing assets comprising the specification of the virtualized version of the venue facilitate generating renderings of the venue, including the rendering of the venue, having any desired arbitrary perspectives of the venue.

16. The method of claim 1, wherein facilitating display of the rendering of the venue comprises facilitating display of the rendering of the venue on a dedicated display at the venue.

17. The method of claim 1, wherein the rendering of the venue facilitates surfacing of additional information associated with one or more objects comprising the rendering.

18. The method of claim 1, wherein the pose of the camera is determined based at least in part on one or more signals available at the device from which pose is determined.

19. A system, comprising:
    a processor configured to:
        determine a pose of a camera of a device located in a venue based at least in part on three-dimensional asset recognition in a field of view of the camera, wherein the field of view of the camera comprises an actual view of the venue and wherein three-dimensional asset recognition is constrained to a prescribed set of objects with placement constraints on movable objects;
        obtain a rendering of the venue corresponding to the actual view of the venue from one or more existing assets comprising a specification of a virtualized version of the venue, wherein foreknowledge of the venue and existing assets comprising the specification of the virtualized version of the venue exist prior to the device being located in the venue; and
        facilitate display of the rendering of the venue by replacing the actual view of the venue as captured by the camera with the rendering of the venue, wherein the rendering of the venue is completely virtualized and does not include any of the actual view of the venue and wherein the rendering of the venue comprises one or more interactive features including user configurable options for one or more objects comprising the rendering; and
    a memory coupled to the processor and configured to provide the processor with instructions.

20. A computer program product, the computer program product being embodied in a non-transitory computer readable storage medium and comprising computer instructions for:
    determining a pose of a camera of a device located in a venue based at least in part on three-dimensional asset recognition in a field of view of the camera, wherein the field of view of the camera comprises an actual view of the venue and wherein three-dimensional asset recognition is constrained to a prescribed set of objects with placement constraints on movable objects;

obtaining a rendering of the venue corresponding to the actual view of the venue from one or more existing assets comprising a specification of a virtualized version of the venue, wherein foreknowledge of the venue and existing assets comprising the specification of the virtualized version of the venue exist prior to the device being located in the venue; and facilitating display of the rendering of the venue by replacing the actual view of the venue as captured by the camera with the rendering of the venue, wherein the rendering of the venue is completely virtualized and does not include any of the actual view of the venue and wherein the rendering of the venue comprises one or more interactive features including user configurable options for one or more objects comprising the rendering.

21. The system of claim 19, wherein the rendering of the venue and the actual view of the venue have substantially the same camera pose.

22. The system of claim 19, wherein the rendering of the venue and the actual view of the venue both comprise substantially a same perspective of the venue.

23. The system of claim 19, wherein the rendering of the venue and the actual view of the venue both comprise substantially a same scene of the venue.

24. The system of claim 19, wherein the rendering of the venue and the actual view of the venue both comprise substantially same scene geometry.

25. The system of claim 19, wherein the rendering of the venue and the actual view of the venue both comprise substantially same scene lighting.

26. The system of claim 19, wherein the rendering of the venue comprises an alternative or augmented version of a scene comprising the actual view of the venue.

27. The system of claim 19, wherein the rendering of the venue comprises at least one scene element having a different configuration than that same scene element in the actual view of the venue.

28. The system of claim 19, wherein to obtain the rendering of the venue comprises to retrieve the rendering of the venue from existing assets.

29. The system of claim 19, wherein to obtain the rendering of the venue comprises to generate the rendering of the venue from existing assets.

30. The system of claim 19, wherein existing assets comprise one or more three-dimensional mesh models.

31. The system of claim 19, wherein existing assets comprise one or more images spanning a plurality of perspectives.

32. The system of claim 19, wherein the rendering of the venue is displayed in real time as the actual view of the venue is captured in the field of view of the camera.

33. The system of claim 19, wherein the rendering of the venue comprises a photorealistic rendering.

34. The system of claim 19, wherein existing assets comprising the specification of the virtualized version of the venue facilitate generating renderings of the venue, including the rendering of the venue, having any desired arbitrary perspectives of the venue.

35. The system of claim 19, wherein to facilitate display of the rendering of the venue comprises to facilitate display of the rendering of the venue on a dedicated display at the venue.

36. The system of claim 19, wherein the rendering of the venue facilitates surfacing of additional information associated with one or more objects comprising the rendering.

37. The system of claim 19, wherein the pose of the camera is determined based at least in part on one or more signals available at the device from which pose is determined.

38. The computer program product of claim 20, wherein the rendering of the venue and the actual view of the venue have substantially the same camera pose.

39. The computer program product of claim 20, wherein the rendering of the venue and the actual view of the venue both comprise substantially a same perspective of the venue.

40. The computer program product of claim 20, wherein the rendering of the venue and the actual view of the venue both comprise substantially a same scene of the venue.

41. The computer program product of claim 20, wherein the rendering of the venue and the actual view of the venue both comprise substantially same scene geometry.

42. The computer program product of claim 20, wherein the rendering of the venue and the actual view of the venue both comprise substantially same scene lighting.

43. The computer program product of claim 20, wherein the rendering of the venue comprises an alternative or augmented version of a scene comprising the actual view of the venue.

44. The computer program product of claim 20, wherein the rendering of the venue comprises at least one scene element having a different configuration than that same scene element in the actual view of the venue.

45. The computer program product of claim 20, wherein obtaining the rendering of the venue comprises retrieving the rendering of the venue from existing assets.

46. The computer program product of claim 20, wherein obtaining the rendering of the venue comprises generating the rendering of the venue from existing assets.

47. The computer program product of claim 20, wherein existing assets comprise one or more three-dimensional mesh models.

48. The computer program product of claim 20, wherein existing assets comprise one or more images spanning a plurality of perspectives.

49. The computer program product of claim 20, wherein the rendering of the venue is displayed in real time as the actual view of the venue is captured in the field of view of the camera.

50. The computer program product of claim 20, wherein the rendering of the venue comprises a photorealistic rendering.

51. The computer program product of claim 20, wherein existing assets comprising the specification of the virtualized version of the venue facilitate generating renderings of the venue, including the rendering of the venue, having any desired arbitrary perspectives of the venue.

52. The computer program product of claim 20, wherein facilitating display of the rendering of the venue comprises facilitating display of the rendering of the venue on a dedicated display at the venue.

53. The computer program product of claim 20, wherein the rendering of the venue facilitates surfacing of additional information associated with one or more objects comprising the rendering.

54. The computer program product of claim 20, wherein the pose of the camera is determined based at least in part on one or more signals available at the device from which pose is determined.

* * * * *

UNITED STATES PATENT AND TRADEMARK OFFICE
CERTIFICATE OF CORRECTION

| | |
|---|---|
| PATENT NO. | : 11,257,250 B2 |
| APPLICATION NO. | : 16/176207 |
| DATED | : February 22, 2022 |
| INVENTOR(S) | : Brook Seaton, Manu Parmar and Clarence Chui |

It is certified that error appears in the above-identified patent and that said Letters Patent is hereby corrected as shown below:

In the Claims

In Column 8, Line(s) 67, Claim 20, after "objects", delete ":" and insert --;--, therefor.

Signed and Sealed this
Seventh Day of March, 2023

*Katherine Kelly Vidal*

Katherine Kelly Vidal
*Director of the United States Patent and Trademark Office*